(12) United States Patent
Lee (10) Patent No.: US 7,115,066 B1
(45) Date of Patent: Oct. 3, 2006

(54) CONTINUOUSLY VARIABLE RATIO TRANSMISSION

(76) Inventor: Paul Z. Lee, 3108 Sharer Rd., Tallahassee, FL (US) 32312

( * ) Notice: Subject to any disclaimer, the term of this patent is extended or adjusted under 35 U.S.C. 154(b) by 432 days.

(21) Appl. No.: 10/361,868

(22) Filed: Feb. 11, 2003

Related U.S. Application Data (60) Provisional application No. 60/356,023, filed on Feb. 11, 2002.

(51) Int. Cl.
  *H02P 17/00* (2006.01)
(52) U.S. Cl. ............................. 477/15; 475/5; 475/153
(58) Field of Classification Search ................ 475/2, 475/5, 153; 477/7, 15
  See application file for complete search history.

(56) References Cited

U.S. PATENT DOCUMENTS

| | | | | |
|---|---|---|---|---|
| 3,831,463 A | * | 8/1974 | Ahlen | ........................ 475/69 |
| 4,973,295 A | * | 11/1990 | Lee | ............................ 475/153 |
| 6,647,328 B1 | * | 11/2003 | Walker | ........................ 701/36 |
| 6,968,260 B1 | * | 11/2005 | Okada et al. | ................. 701/35 |

* cited by examiner

*Primary Examiner*—Ha Ho
(74) *Attorney, Agent, or Firm*—Miles & Stockbridge P.C.; Edward J. Kondracki (57) ABSTRACT

A continuously variable ratio transmission including a planetary gear set having a sun gear, a ring gear, and a planet carrier having at least two planet gears carried thereon, a control element including a servogenerator capable of generating electric power, and at least one auxillary field coil adapted to be operatively connected to an output means to influence a power output level and AC power frequency of the output means, the at least one auxillary field coil being powered by the servogenerator and constituting a load to the servogenerator, the speed of the servogenerator being capable of being controlled by the load; and a means for controlling an electrical current to the at least one auxiliary field coil form the servogenerator; where the servogenerator is capable of being driven to produce electrical power by a rotation of one of the sun gear, the ring gear, and the planet carrier.

8 Claims, 5 Drawing Sheets

Planetary with Meshed Planets

CONTINUOUSLY VARIABLE RATIO TRANSMISSION

CROSS-REFERENCE TO RELATED APPLICATIONS

This application claims the benefit of the filing date of U.S. Provisional Patent Application No. 60/356,023, filed Feb. 11, 2002. The entire disclosure in that application is hereby expressly incorporated by reference herein.

BACKGROUND OF THE INVENTION

1. Field of the Invention

The present invention relates to continuously variable ratio transmissions (CVT) employing planetary gear sets, and a system in which the CVT is integrated with the input driver and output driven systems through a regenerative/control subsystem. The present also relates to varying forms of the planetary gear set used in the CVT.

2. Description of Related Art

Planetary gear sets are well known in the art as a form of a mechanical transmission device. The planetary gear set operates with three rotary elements rotating around at least three different axles. The three rotary elements are a sun gear, a ring gear, and a planet gear/gears carried on a planet carrier. The three elements are meshed together via gear teeth, for example.

Figure 1:
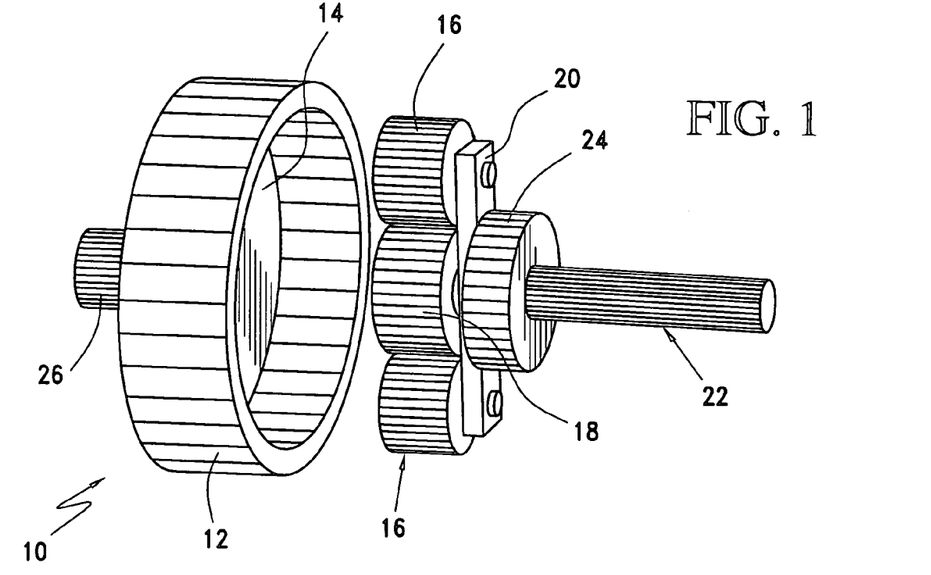
FIG. 1 is a substantially schematic perspective and exploded view of a planetary gear set that is suitable for use in a continuously variable transmission.

FIG. 1, shows, schematically, an exploded view of a basic planetary gear set 10. The ring gear 12 has a cavity 14 into which the planet gears 16 and sun gear 18 are positioned. Planet gears 16, carried on planet carrier 20, mesh with an inner surface of the ring gear 12. Sun gear 18 meshes with the planet gears 16 at an inner extent. Sun gear 18 has an axle 22 extending through planet carrier 20, and a control gear 24 of planet carrier 20 may be driven at varying rates or locked in place, to provide the variation in the transmission ratio between the sun gear axle 22 and the ring gear axle 26.

Figure 2A:
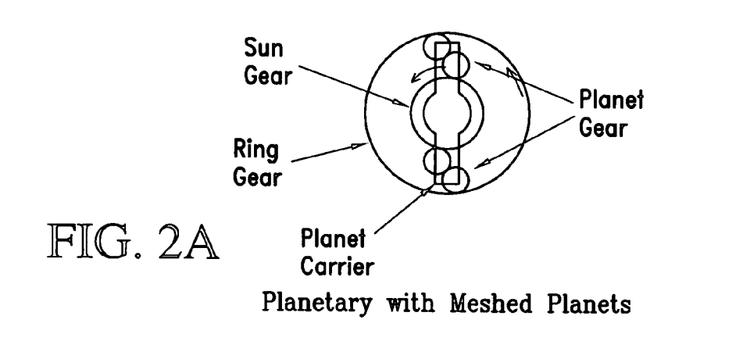
FIGS. 2A–C are substantially schematic views of alternative planetary gear sets to the one depicted in FIG. 1, which are suitable for use in a continuously variable transmission.
Figure 2B:
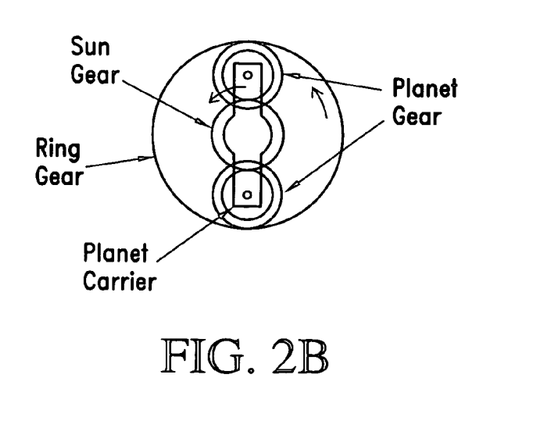
Figure 2C:
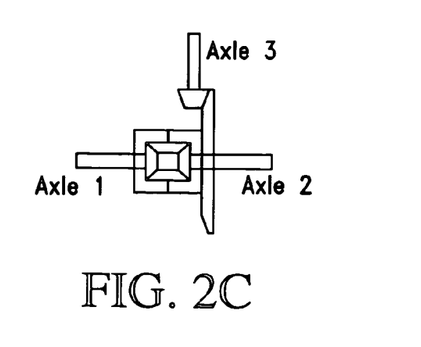

FIGS. 2A–C illustrate variants on the basic planetary gear set shown in FIG. 1, all of which can be suitable for use in a CVT. FIG. 2A illustrates a planetary gear set having multiple meshed planet gears. FIG. 2B illustrates planetary gear set employing compound planet gears, meaning that the planet gears at either end of the planet carrier are each actually made up of two gears of different diameters, the gears of one diameter engaging the ring gear, and the gears of the other diameter engaging the sun gear. FIG. 2C is a simple differential having at least three rotary elements that are accessible from coupling with axles outside the transmission system. One of the rotary elements can be subjected to external control to vary the transmission ratio of the other two rotary elements axles.

In most current industrial applications, one element or axle, for example, the ring gear/axle, work as the input axle. A second element or axle, for example, the sun gear/axle, works as the output axle. The third element and axle, e.g., the planet carrier with its planet gears, in this example, has a rotation control device such as a brake or clutch, to cause the other two elements to rotate at a fixed ratio of rotary speeds. The roles of the three gear/axle elements may be interchanged, and the foregoing is simply one example. Planetary gear systems have inherently high efficiency when used in transmission applications of this type.

U.S. Pat. No. 4,973,295, issued on Nov. 27, 1990, to the present inventor, discloses a stepless (continuously) variable ratio transmission (CVT) in which all three rotary elements are capable of rotating, and the rotation of the axle that is not the input or output axle is variably controlled to vary the transmission ratio between the other two elements. The disclosure in this patent is hereby expressly incorporated by reference.

In one of the embodiments disclosed in the '295 patent, the planet carrier is operated to control the transmission ratio between the sun gear/axle and ring gear/axle, by coupling the planet carrier to a worm gear which is driven at a desired speed (or held stationary, at one extreme) by the worm which in turn is driven by a motor such as a stepping motor or servomotor. The motor is controlled by a computer which monitors the speed of the input and output axles, to control the motor to drive the worm gear at a speed which will yield the desired rotary relationship (ratio) between the input and output axles.

Planetary gear systems and variations thereon are three (or more) terminal mechanical systems in which a larger flow of energy between the input and output is controlled by the lower energy control terminal. The ratio between the larger energy flow under control and the energy needed to provide such control is called control gain. For example, if a 1 hp servomotor is needed to control a CVT connecting between a motor and a water pump both with nominal power of 100 hp, then the control gain of the system is roughly around 100.

The range of CVT transmission ratios is the ratio between the highest and lowest transmission ratios at which a CVT is designed to work. For example, if a CVT works between 3:1 (ratio=input RPM:output RPM, therefore higher reduction has higher ratio value) and 1:1, then the ratio range is 3. If, on the other hand, a CVT works between 3:1 and 1:3 will have a ratio range of 9. The latter is defined to have a wider range (9) than the former (3).

The overall efficiency is important for evaluating a mechanical transmission system. A transmission needs energy to overcome friction, for energy conversion, and for accessories that are necessary for the functioning of the transmission system. The ratio between the energy available for output and the total energy input is the overall efficiency of the system.

In the CVT disclosed in the '295 patent, the progression angle of the worm—worm gear pair was chosen at the "critical angle" so the worm—worm gear is in between the self-locking and non-self-locking condition. In other words, the power needed to drive and control the rotation speed of the step-/servo-motor is minimized. Also, part of the energy needed to overcome the friction involved in the worm—worm gear is from the main energy source of the input axle.

When a CVT system, such as the one disclosed in the '295 patent, works within a ratio range, e.g., for reduction, the minimum reduction ratio is achieved by mechanical geometry design of the gear set while assuming the control axle is in standstill condition. The control axle has to spin faster when higher reduction ratio is required. Despite the mechanical gear system's inherent high efficiency, the overall efficiency will be the highest when the control axle is not moving, because the system does not need to overcome the friction involved in the worm system, nor is any energy needed to rotate the servomotor to drive the worm. When the control axle is moving faster at the upper range of the variable ratios, the overall efficiency will be lowered.

Thus, while a CVT of such design works in a wide range of transmission ratios, at the higher transmission ratio side of the range, the overall efficiency will be at the lowest.

In addition to efficiency concerns when operating at the higher end of transmission ratios, certain applications for which a CVT might be considered have requirement for low noise and the like, for which gear sets operating with meshed gear teeth may not be suitable.

Further, applications may exist in which the efficiency and control gain desired from a CVT can not be adequately met by a single planetary gear set.

It is therefore a principal object of the present invention to provide CVT system that improves upon the overall efficiency of the system in operation, particularly at the upper end of transmission ratios.

It is a further principal object of the present invention to provide low-noise CVT designs for use in applications requiring low noise operating conditions.

It is yet a further principal object of the present invention to provide a CVT systems having improved control gain and efficiency characteristics.

SUMMARY OF THE INVENTION

The above and other objects of the present invention are achieved by coupling an auxiliary variable load electric generator, or servogenerator, to the control axle of the CVT. The servogenerator will generate electrical power especially in conditions in which the control axle to which it is coupled is being rotated at higher speeds. As noted in the Background section, it is at these speeds that the overall efficiency of the mechanical transmission is lowest. The electrical power generated by the servogenerator is put to use in the system to thereby increase the overall efficiency to a higher level.

The invention further involves the option of using, for low-noise applications, resilient gear elements which do not mesh by means of gear teeth, but rather by frictional engagement. Such elements reliably operate to maintain the desired input axle and output axle speed, and control of the transmission ratio, while substantially reducing the noise generated in operation, as compared with a system employing the meshing of steel (or other hard metal) gear teeth.

The improvements in control gain that may be realized in the present invention are obtained by providing a compound CVT system, in which a primary CVT controlling the main input/output ratio is itself controlled by a secondary CVT, whose output is used in controlling the control axle of the primary CVT. In situations in which a control gain (or amplification factor) of 100 is obtained from the primary CVT controlling the primary input/output ratio, a second CVT having significantly lower power requirements can be employed to yield a control gain of 100, for example, in controlling the primary CVT. The overall gain or amplification factor in such a system would thus be 10,000.

BRIEF DESCRIPTION OF THE DRAWINGS

These and other features of the present invention, and the attendant advantages will be readily apparent to those having ordinary skill in the art, and the invention will be more easily understood from the following detailed description of the preferred embodiments of the present invention, taken in conjunction with the accompanying drawings, wherein like reference characters represent like parts throughout the several views, and wherein.

DETAILE DESCRIPTION OF THE PREFERRED EMBODIMENTS

Figure 3:
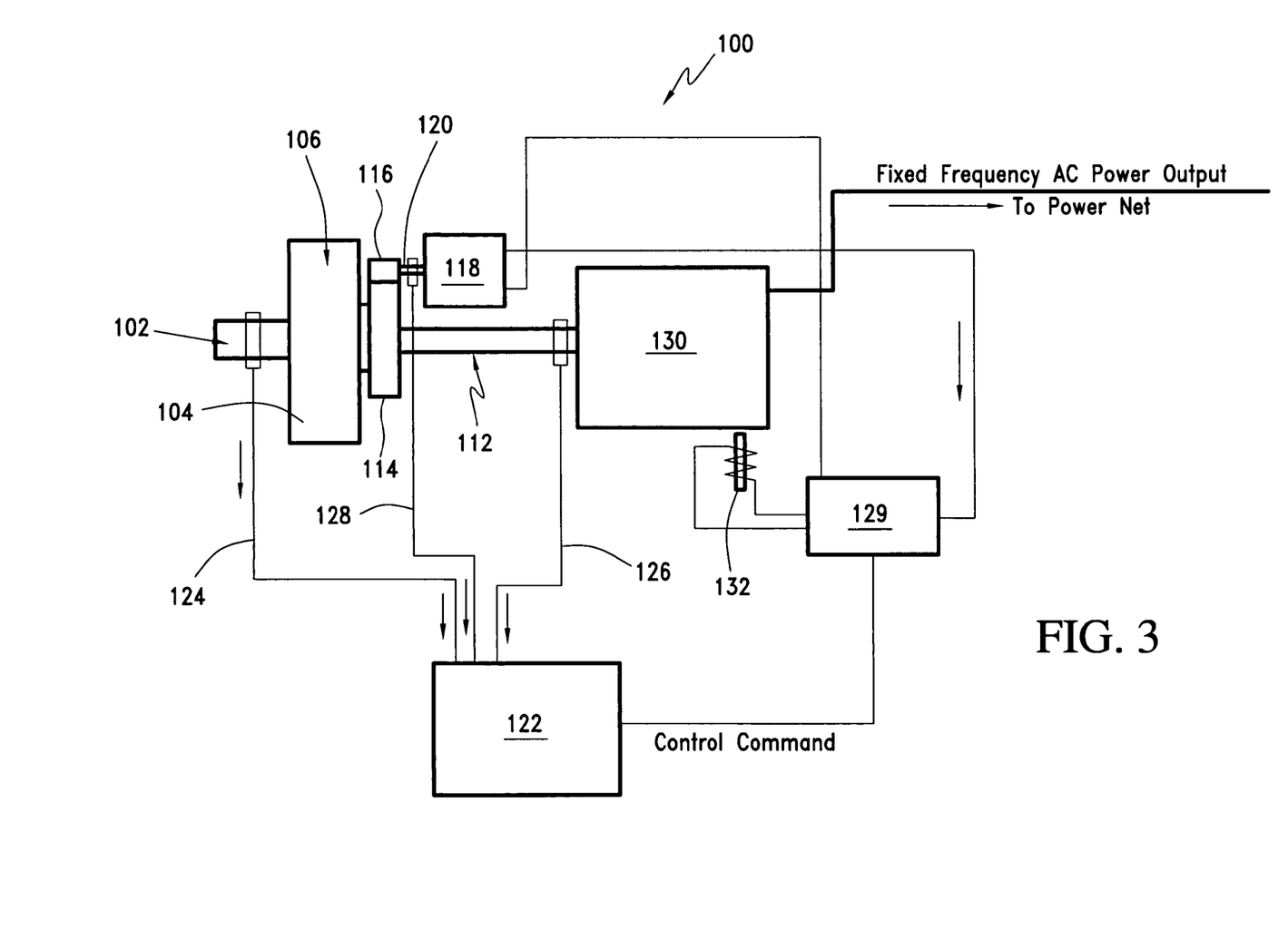
FIG. 3 is a substantially schematic view of a continuously variable transmission system, which is in accordance with a preferred embodiment of the present invention.

FIG. 3 illustrates, in schematic form, a continuously variable ratio transmission (CVT) system 100 in accordance with a preferred embodiment of the invention. In this embodiment (see also FIG. 4), a drive axle 102 connected to ring gear 104 provides the input to the system. Various preferred input sources will be described later in this specification.

Figure 4:
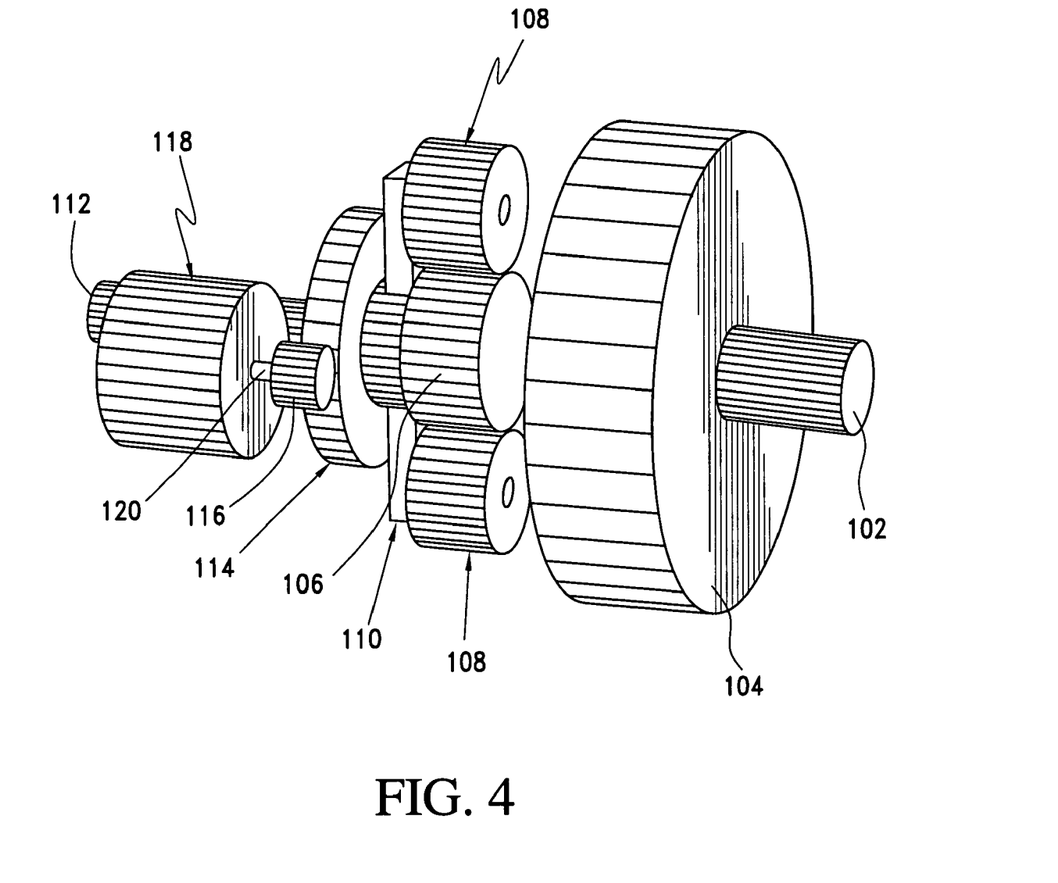
FIG. 4 is a substantially schematic perspective and exploded view of a planetary gear set and a servogenerator control, according to a preferred embodiment of the present invention.

Ring gear 104 is coupled to sun gear 106 via planet gears 108 rotatingly attached to planet carrier 110. The view in FIG. 4 is an exploded view, and as will be well understood in the art, planet gears 108 and sun gear will, in operation, be housed within ring gear 104.

In the FIG. 3 embodiment, sun gear axle 112 is the output axle from the CVT. The transmission ratio between the drive or ring gear axle (input) 102 and sun gear axle (output) 112 is controlled by the planet gears and carrier 108, 110. More specifically, control of the ratio is effected by controlling the rate of rotation of planet carrier 110.

In the depicted preferred embodiment, the rate or speed of rotation of the planet carrier 110 is controlled by interaction of a control gear 114 affixed to planet carrier 110, and an acceleration gear 116. Acceleration gear 116 is, in turn, coupled to a servogenerator 118 via a servogenerator axle 120.

The control gear 114 and acceleration gear 116 can be any of a worm gear system or another gear system (e.g., spur gear, helical gear, cycloid gear). When a worm gear system is employed, it is preferred that the system is selected such that it works in a non-self-locking condition, so as to be bi-directional. It would also be possible to directly connect servogenerator 118 to a control axle upon which planet carrier 110 is rotated.

For any particular application, the various gear ratios, based upon expected ranges of input axle speeds and desired ranges of output axle speeds, are preferably selected such that, within all expected ranges of operation, control gear 114 will operate to drive acceleration gear 116, to thereby permit servogenerator to generate power. This may be described as splitting the input power into a primary power generator and a secondary power generator. Persons of ordinary skill in the art will, upon reading this disclosure, be able to design systems in which this will occur.

It is also possible, if desired, to intermittently employ the servogenerator as a servomotor, as necessary, to drive the control gear 114, in order to increase the rate of revolution of planet carrier 110 to a rate faster than the "freewheeling" speed of the planet carrier, to provide certain transmission ratios. However, because a desired objective of the system of the present invention is to generate electrical power with the servogenerator 118, this is not seen as being a preferred design or operating mode under ordinary situations yet is still within the range of the anticipated design criteria.

Turning back to FIG. 3, it can be seen that the invention includes a computer or processor 122 that receives data from axle speed encoders 124, 126, 128, operatively coupled to drive or ring gear axle 102, sun gear axle 112, and servogenerator axle 120, respectively. Axle speed encoders, such as digital optical encoders, suitable for use in this application, are well known in the art. The computer or processor 122 employs the data collected from the axle speed encoders to control the CVT and the overall system in accordance with a predetermined control scheme, which scheme is generally dependent upon nature of the system in which the CVT and servogenerator are employed.

In operation, as an example used in wind power generation where the output axle connected to the main generator needs to operate at a fixed speed in order to produce a fixed frequency AC power matching the frequency and phase of the regional power net. The wind power is delivered to the CVT by the rotation of the ring gear axle 102, and computer 122 monitors especially the axle speed of the sun gear (output) axle, to determine whether that axle speed is at a prescribed speed, or within a prescribed range of speeds. If the sun gear axle speed is within such range, computer 122 will simply continue to monitor the axle speed conditions. If, however, the sun gear axle speed is outside the prescribed range, computer or processor 122 will send control commands to a current chopper controller 129. Current chopper controller in turn controls a load imposed on servogenerator 118, which affects the amount of torque required to drive the servogenerator.

In the embodiment illustrated in FIG. 3, the load to the servogenerator is the current delivered to auxiliary field coils 132 at the main generator which could preferably be a synchronous AC generator with DC excitation field. The amount of current is controlled by current chopper controller 129.

Current chopper controller may preferably comprise a fast switching semi-conducting device, such as an insulated gate bipolar transistor (IGBT). Alternatively, a silicon controlled rectifier (SCR) may be employed, as may any number of devices suitable for efficiently controlling an electrical load at the servogenerator 118. The servogenerator load control may be accomplished in this system by the processor 122 sending on/off switching signals to controller 129. The load is increased by increasing the "on" time of the chopped current transmitted to auxiliary field coils 132, and the load is reduced by reducing the "on" time of the switch, relative to the "off" time.

When the sun gear axle 112 is rotating at a speed above a prescribed range because of the reduction of its load, it is necessary to have the planet carrier increase its rotational speed, and this can be accomplished by reducing the load, thus lowering the torque required to turn servogenerator axle 120. This, in turn, permits control gear to rotate at a higher speed, because it will encounter less resistance from the servogenerator. In this situation, the "off" time of the switch is increased to reduce the load to a desired level.

Conversely, if the sun gear axle speed is lower than the lower limit of the prescribed range, it is necessary to slow the rotational speed of the planet carrier 110. This may be accomplished by increasing the load (increasing the "on" time for the switch) at the servogenerator 118, increasing the torque requirements necessary to drive acceleration gear 120. This will have the effect of slowing down the control gear 114 and the planet carrier 110 affixed thereto.

While this control process and device is preferably provided in the system 100, it is also possible to employ a servogenerator 118, which is of essentially standard servomotor design, that is equipped with an electromagnetic or electromechanical brake, as it commonly the case with servomotors currently in use. The brake will generally be coupled coaxially with the servogenerator. The brake is provided as a speed control device for the servogenerator for use in instances in which the controlling of load current to the auxiliary field coils of the main generator does not provide sufficient slowing of the servogenerator to achieve necessary transmission ratios. A brake controller is preferably provided in the same electronics package as is current chopping controller 129. The control of the brake will generally be effected by computer 122 delivering signals to controller 129. A separate IGBT or SCR switch or switches will preferably be employed to switch the brake between on and off positions.

FIG. 3 shows that the output from the CVT, namely, the rotation of sun gear axle 112, may be used as an input to a main generator 130 designed to produce electrical power. The main generator may be designed to produce fixed frequency AC power.

FIG. 3 also illustrates that, when servogenerator 118 is driven by control gear 114, it, too, produces electrical power. That power may preferably be transmitted to current chopper controller 129. Current chopper controller 129, in turn, delivers this power to auxiliary field coils 132 (one shown in FIG. 3), which has the effect of increasing the electromagnetic field strength in main generator 130. The increased electromagnetic field strength thus realized in the main generator increases the overall power output from the generator, but will not change the frequency of the power delivered.

FIG. 3 also shows schematically that a wind turbine 134 may be provided at the input end of the system, to drive ring gear axle 102 or another rotational element that is coupled to ring gear axle 102. Such a system would be employed to harness wind power, and to convert that to electrical power. Numerous wind turbine power generator designs have been proposed and implemented over the years. Such systems have design and operational problems, and/or suffer from lowered efficiencies under changing wind conditions. The CVT and auxiliary load generator of the present invention overcome many, if not all, of these disadvantages.

As an illustrative, non-limiting example, in the present system, a wind-based electrical power generation system is preferably designed based upon the nominal average or median wind power for the area where the system is to be installed. At this wind speed, it is desirable to set the various gear ratios of the CVT such that the wind turbine 134 may operate at its most efficient RPM, with the main generator 130 operating at a rotational speed which will produce a nominal capacity of fixed frequency AC power to be delivered to the power grid or network of that region. In this design also, the servogenerator 118 will preferably operate at about 50% of its maximum speed under the average or median wind power conditions. A suitable servogenerator for use in this application may preferably have a maximum speed on the order of about 1000–3000 RPM.

Again, merely to illustrate how the system can and will adapt to changes in wind power or wind speed, it can be assumed that the median speed for the wind turbine is designed to be 30 RPM, and that this will represent the normal operating conditions. The main generator 130, operating from the sun gear axle 112 input, can be controlled to rotate at 3600 RPM in producing 60 Hz AC power. The transmission ratio is thus 3600:30, or 120:1.

When the wind energy increases and turbine 134 begins rotating at a faster rate, for example, at 45 RPM, the system will be required to maintain the output RPM (sun gear axle) at 3600 RPM. The required transmission ratio thus becomes 3600:45, or 80:1. In order to attain that ratio, the servogenerator 118 and control gear 114 affixed to planet carrier 110 must rotate faster than at the median condition. In reality, under a higher wind, not only will the servogenerator 118 and planet carrier 110 begin to rotate faster, so will sun gear 116, and sun gear axle 112, at least momentarily.

When the servogenerator rotates faster forced by the increased wind power, it will generate more electrical power, which will be transmitted through current chopper controller 129, to auxiliary field coils 132 even with the decreased 'on time' relative to the previous conditions before the increase of wind power. The increase in electromagnetic field strength experienced in main generator 130 as a result, will have the effect of tending to retard any speed increase of the rotor in the main generator 130 since it will produce more power while rotating at the same speed. This aspect of the system is effectively at least a partially self-correcting function.

It will be understood from this description that the power from the wind turbine is effectively split between the sun gear axle (output) 112 and the control gear 114/servogenerator 118. The portion of the power split off to servogenerator 118 under nominal wind power conditions is less than that sent through to the main generator 130. Under increasing wind power conditions, where most, if not all, existing designs do not capture that power, the CVT and auxiliary load generator of the present invention are able to capture and transmit that power to effect an increased electromagnetic field strength at the main generator therefore generates more energy for the outside network while keeping the frequency constant. Thus, the efficiency of the system is further improved.

This increase in electromagnetic field strength results in an increase in the overall power output from the generator, but will not change the frequency. The invention is capable of using all of the available power of stronger winds, instead of allowing that additional energy to pass uncaptured. In the meantime, the present invention will save the high cost and complexity of high power electronic converters and the accompanied problems of harmonics and power factor used in some other modern wind power generation systems. Besides, the present invention will use the multiphase synchronous generator which is less costly, with longer life and simpler maintenance and produce purer sine wave AC power.

Figure 5:
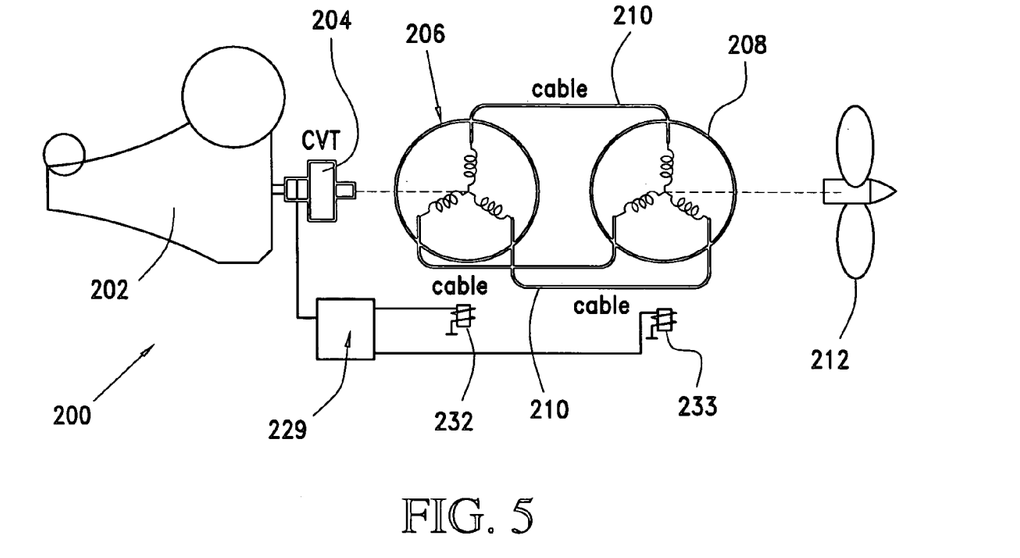
FIG. 5 is a substantially schematic view of a variable speed drive system according to a preferred embodiment of the present invention.

FIG. 5 schematically illustrates an alternative preferred industrial application for the CVT/servogenerator assembly of the present invention. This application is in the area of a variable speed drive system, which may preferably be suitable for use for electric ships or land vehicle propulsion, for example, MAGLEV vehicles/systems, conveyors, roller coasters, or other land vehicles operating using hybrid or electric power.

In contrast to the wind turbine system illustrated in FIG. 3, in a variable speed drive system for vehicle propulsion 200, a prime motor 202 will preferably operate at a fairly constant optimum speed, and the output speed will be varied to propel the vehicle at a desired vehicle speed. The prime motor 202 may preferably be, for example, an internal combustion engine, a gas turbine, a steam turbine, a nuclear steam turbine, or a fixed speed electric motor.

In this variable speed drive system 200, CVT, shown schematically at 204, but having the same basic components as shown in FIG. 3, connects the prime motor to a multiphase AC generator 206. The variable frequency AC power that is generated is then sent to wheel motors or to a propeller, in electric ship applications.

When this variable speed drive system 200 is used in an electric ship, a multi-phase synchronous motor 208 is coupled to the multiphase AC generator 206, as by cables 210, as illustrated schematically in FIG. 5. The multiphase synchronous motor 208 is preferably directly coupled to propeller 212. When the system 200 is employed in a land vehicle, one preferred design would have multiphase synchronous wheel motors to propel the wheels, and the output from generator 206 is transmitted to those motor. MAGLEV (magnetic levitation) vehicles, are conventionally driven by linear motors, as are other moving mechanical systems such as conveyor belts and roller coasters. In situations in which linear motors are employed, the multiphase synchronous motor is replaced by a multiphase synchronous or induction linear motor, and the power generated by AC generator 206 is sent directly to the linear motor or motors.

The CVT, in this embodiment, operates to change the transmission ratio between prime motor 202 and AC generator 206. This, in turn, varies the speed of the generator 206, which thus causes the generator to produce power at variable frequencies. This variable frequency AC power changes the speed at which the wheels of a vehicle or propeller of a ship operates.

As was the case with the FIG. 3 embodiment, a servogenerator (not shown in FIG. 5, 118 in FIG. 3) is provided, and is coupled to control gear 114 via acceleration gear 120. In driving the servogenerator via this coupling, the CVT splits off a minor amount of the power delivered by prime motor 202. The servogenerator preferably generates a DC current which, under control of current chopper controller 229, can be used to provide DC excitation current to auxiliary excitation coil 232 located at generator 206. This will have the result of increasing the output current of generator 206. Additionally, in the case where a multi-phase synchronous motor 208 is coupled to generator 206, a further auxiliary excitation coil 233 may be located at the motors 208. When DC excitation current is provided to excitation coil 233, the torque of the motor will be increased. This increased toque is useful when the vehicle/ship is operated at low speeds. Computer 222 and load controller 229 will preferably be equipped with control schemes which will allow controller 229 to send the DC excitation current to either generator auxiliary coil 232, or to motor auxiliary coil 233, or to both, as dictated by the then prevailing operating conditions.

The high efficiency obtained by using a CVT and the controlled load servogenerator in a variable frequency/speed drive system is but one important advantage over current systems. The use of the CVT to control transmission ratios to vary the frequency of the AC generator output may, in electric ship applications, for example, eliminate the need for rectifiers, batteries, variable frequency converters and filters that are currently employed in conventional electric ship propulsion designs. Using the present design, the propelled may be driven directly by a motor.

It is also possible, using the present design, when the needs for propulsion power have been reduced or are not needed, to turn part of or the entire array of propulsion electric generators, which are variable frequency multiphase AC generators when functioning as propulsion generators (for example, generator 206) into multiphase AC generators of a fixed frequency to join the other generators to the whole ship network to supply electric power to other electrical devices used onboard the ship.

Figure 6:
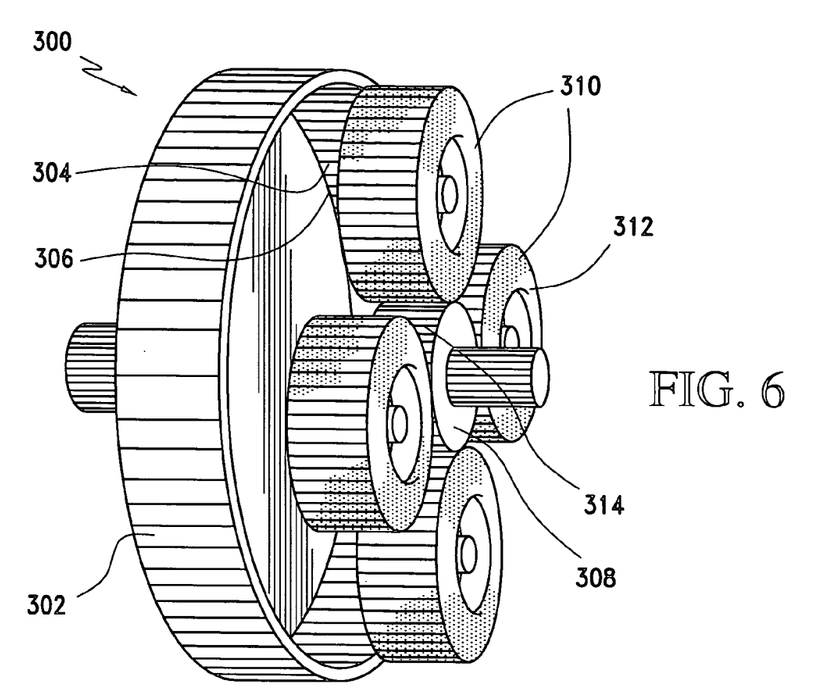
FIG. 6 is a substantially schematic exploded perspective view of a low-noise planetary gear set according to a preferred embodiment of the present invention.
Figure 7:
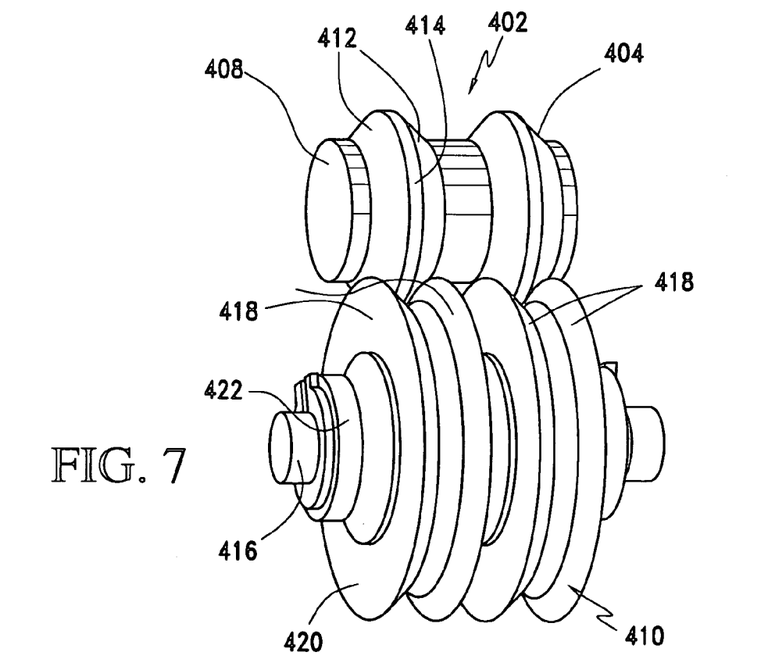
FIG. 7 is a substantially schematic perspective view of an alternative low-noise planetary gear set.

Turning now to FIGS. 6 and 7, two alternative preferred embodiments of a "low-noise" CVT are illustrated in substantially schematic form. As the variable speed system 200 in FIG. 5 will be suitable for use in driving the propeller of a ship, it is to be noted that it is highly desirable, and it is sometimes required, that a transmission being operated in close proximity to the propeller emit very low levels of noise. Depending upon the particular design, a gear-based CVT may or may not meet noise emission requirements, in that the meshing of teeth of hard steel and/or other hard materials will produce noise that may be regarded as excessive by certain low-noise standards. The embodiments shown in FIGS. 6 and 7 greatly reduce the noise of a CVT during operation.

In the FIG. 6 embodiment, the "gears" of the planetary gear system 300 are not of the type in which gear teeth mesh together to drive the gears. The components will continue to be referred to herein as "gears", although the components could alternatively be referred to as "rollers", as they are driven by frictional rolling engagement.

Ring gear 302 may be made of any suitable substantially rigid material, including steel, other metal or metal alloy, rigid and strong polymeric materials, and fiber-or powder-reinforced polymers. The inner annular gear-engaging surface 304 of ring gear 302 should preferably have a high coefficient of friction (alternatively referred to as "high friction"). This may be obtained by using a material that inherently has a high coefficient of friction. Alternatively, the surface 304 can be, either during or after fabrication, roughened, grooved, micro-grooved, or knurled, in order to produce a higher coefficient of friction. A liner or coating 306 may alternatively be adhered to surface 304, for example, a rubber coating or other high-friction material coating.

In a similar manner, sun gear 308 and planet gears 310 are preferably designed to present high friction drive surfaces. As shown in FIG. 6, the planet gears 310 may be pneumatically inflated tires 312 joined together by a planet carrier (not shown). Sun gear 308 may, too, be a pneumatically inflated tire, or may alternatively comprise a solid, effectively non-resilient element (steel or hard plastic) that is optionally provided with a peripheral coating 314 of a high-friction, possibly resilient material. By the same token, planet gears 310 may be of similar construction described with respect to sun gear 308.

In operation, when planet gears 310 and sun gear 308 are housed within ring gear 302, the components are preferably "pre-stressed", such that stable interference fits between the ring gear and planet gears, and between the planet gears and the sun gear, are obtained. This will assure that adequate frictional forces will exist, such that the gears/rollers will find traction with adjacent components, and slippage will be avoided.

Many variations on this basic design are possible. In addition to the inner ring surface 304 of ring gear being roughened or otherwise treated to increase the coefficient of friction thereof, the peripheral surfaces of planet gears 310 and sun gear 308 can be prepared in the same manner. The rollers may be made of metal, powder metallurgy products, polymers including polyamide, polyimide, phenolics, elastomers (e.g., rubber, polyurethane, synthetic rubber), fiber- or powder-reinforced polymers, or may be polymer rollers with metal inserts. The rollers may further be fitted with sleeves or anti-friction bearings at their centers. Linings or coatings made of one or more of the above materials (in particular, the elastomers) can be provided on the gears/rollers.

Any of the gears/rollers may also have grooved contact surfaces, or relief patterns on the contact surfaces to further increase traction between the rollers and to aid in heat dissipation.

An alternative preferred low-noise planetary gear assembly is depicted in FIG. 7. In this drawing figure, only the sun gear 408 and one of a plurality of planetary gears 410 are shown, for purposes of clarity of illustration. It will be readily understood by persons of ordinary skill in the art that a planetary gear system according to this embodiment will have one or more additional planet gears, all of which are coupled by a planet carrier, as well as a ring gear.

In FIG. 7, sun gear 408 may preferably be made of steel or other metal, and will have a peripheral surface profile 402 that includes one or more (two shown) angled projections 404 extending radially away from a central cylindrical body 406. As shown, the projections 404 have two converging slanted walls 412 joined by a short cylindrical web 414 at the outer extent.

Each planetary gear 410 (one shown) is designed to frictionally engage the projections 404 on sun gear 408. Planetary gear 410 has a central axle 416 onto which are fitted two pairs of discs 418 having peripheral surfaces 420 that are angled or canted to mate with the angled surfaces on projections 404 of sun gear 408. Interposed between each disk of each pair of disks, and between the two pairs of disks, is a disk spring, preferably of a type known as a Belleville spring. These springs are sized to retain proper spacing of the disks 418, such that they will engage the complementary surfaces on projections 404. The disks and disk springs are retained on axle 416 preferably in a prestressed condition, by spring clips 422 secured at two ends of the axles. The inner surface of the ring gear (not shown) will have a surface profile which is substantially the same as the surface profile or contour as has the sun gear, so that reliable frictional contact between the planet gears and the ring gear is obtained.

Both of the FIG. 6 and FIG. 7 designs will operate in a transmission with greatly reduced noise levels, compared with traditional gear sets having meshing gear teeth made of hard metal. Another major advantage to these and other designs in which rollers (gears having no meshing gear teeth) are used, is that noise between different components of the overall system are isolated. In the ship propulsion example, such a transmission would provide isolation between the motor and the propeller, in addition to eliminating the noise generated by meshing gear teeth.

Such systems may also lead to significant reduction in the cost of manufacturing and maintenance of planetary gear systems. Further, high precision and smooth rotary movement are made possible, with no cogging effect or backlash. In additions, the selection of the sizes of the gears/rollers will be greater in most instances, so long as the sizes of the rollers and their constructions will permit the correct contact pressure between the rollers.

Figure 8:
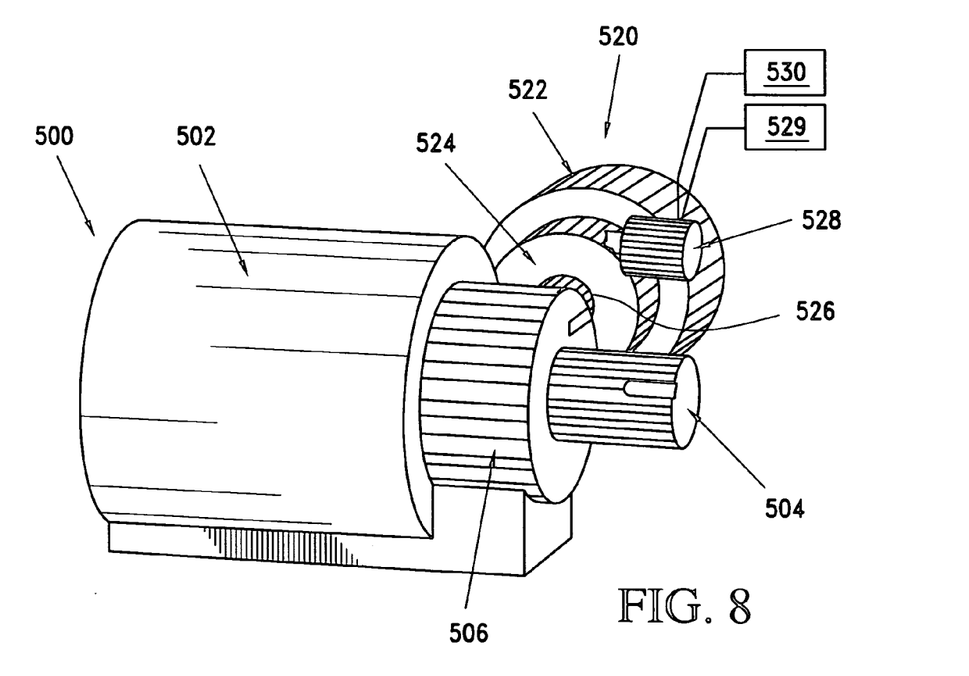
FIG. 8 is a substantially schematic view of a high efficiency transmission control system according to a preferred embodiment of the present invention.

Further improvement in operating efficiency and control gain can be obtained by controlling the main CVT of a system, such as the CVT shown in FIGS. 3 and 5, with the output from a secondary system whose output is itself controlled by a CVT. FIG. 8 schematically illustrates an example of such a system. Main system 500 includes a prime motor 502 which, for the purposes of this illustration, will operate at a substantially constant speed. The prime motor 502 provides power to a main output axle 504, which is required to operate at controlled variable speeds. A main CVT 506 is employed to provide the transmission ratios necessary to convert the constant speed of the prime motor 502 to the desired speed of the output axle 504. The output axle may be secured to the sun gear (not specifically shown) of the main CVT itself, or may be coupled in a known way to the sun gear or whichever of the elements (sun, planet, ring) is set up to provide the output of the main CVT 506.

As disclosed earlier herein, and in the '295 patent originally, one of the elements of main CVT 506 will be established as the control element. For purposes of illustration, the planet carrier (not specifically shown) will be used as the control element for main CVT 506. As such, the speed of rotation of the planet carrier must be controlled in order to vary the transmission ratio between prime motor 502 and output axle 504, in order to achieve the desired speed for output axle 504.

Planet carrier may have a gear fixed thereto in a manner similar to that shown in FIG. 4. That gear is driven, braked, or even locked by an external controller, in order to produce the necessary transmission ratio between input and output. In the FIG. 8 system, that control is provided by an output from a secondary CVT.

Controller 520 is illustrated as including a secondary motor 522, operating at some constant speed, a secondary CVT 524, output axle 526, and a servomotor or stepping motor 528. Servo/stepping motor 528 is controlled via signals from computer 530.

Computer 530 receives information regarding the desired speed of main output axle 504, and controls the secondary CVT 524 to produce a transmission ratio between secondary motor 522 (constant speed), and output axle 526, such that output axle, in turn, will be operating at a speed which will controls the speed of the planet carrier of main CVT to produce the necessary transmission ratio for the desired output speed of the main output axle 504. In this manner, only a very small servo/stepping motor is required to control the output of a much more powerful system, i.e., the output of main output axle 504.

This serial coupling of a secondary CVT system with a main system results in a vast increase in control gain. In an illustrative example, a 1 hp servomotor 528 is employed to control constant speed secondary motor 522 which may be a 100 hp motor. The variable speed output of the controller 520 has sufficient power to then control the output of a much larger motor, such as prime motor 502, which may be on the order of 10,000 hp. The power needed for control is thus only 0.01% of the total controlled.

The major advantage of providing the controller 520 with secondary CVT 524 is that the computer controlled motor controller 529, the interface, and the servomotor 528 may be very light duty, simple, small and inexpensive, as compared with other potential controllers.

The overall system in FIG. 8 also obtains a high power variable speed output using primary and secondary motors which are less expensive, high efficiency constant speed motors, both of which can be supplied directly by the power network. Since the prime and secondary motors are continuously running at constant speeds, the power surge or dip to the network at the actual mechanical loading and unloading moment will be greatly reduced. The prime and secondary motors may even by started under no load conditions controlled by either software or hardware.

It is to be noted that, while the systems described herein have generally been discussed as having either a constant speed input or output, the principles of the invention can be employed as well in systems in which both the input speed and the output speed of the transmission are variable and are under control. Such is the case with automobiles and certain other vehicle applications. In such applications, neither the prime motor nor the output axle operates at a constant speed, and the control system will thus have to accommodate the appropriate transmission ratios for the changing needs of the varying speed and torque combinations.

What is claimed is:

1. A continuously variable ratio transmission (CVT) system for controlling a transmission ratio between an input means and an output means over a continuously variable range comprising:
    a planetary gear set having three rotary elements including a sun gear, a ring gear, and a planet carrier having at least two planet gears carried thereon, each of said rotary elements being adaptable to function as said input means, said output means or a control means;
    said control means comprising a servogenerator capable of generating electric power, an electric output of said servogenerator connected to at least one auxiliary field coil in a main generator driven by said output means to influence a power output level and the transmission ratio to influence the alternating current (AC) power frequency of said main generator, said at least one auxiliary field coil being capable of being powered by electric power generated by said servogenerator and constituting a load to said servogenerator, the speed of said servogenerator being capable of being controlled by said load, and said load being controllable by a computerized controller; and
    means for controlling an electrical current to said at least one auxiliary field coil from said servogenerator;
    said servogenerator of said control means being coupled to one of said sun gear, said ring gear, and said planet carrier, such that said servogenerator is capable of being driven by a rotation of that element, to produce electrical power and to affect the transmission ratio.

2. A system as set forth in claim 1, wherein said sun gear and said at least two planet gears comprise roller elements adapted to frictionally engage each other, and wherein said ring gear has an internal surface capable of frictionally engaging a peripheral surface of each of said at least two planet gears.

3. The system of claim 1 further comprising:
    a prime motor operatively coupled to said output means;
    a primary continuously variable ratio transmission including said planetary gear set;
    a secondary continuously variable ratio transmission including a secondary planetary gear set having a secondary sun gear, a secondary ring gear and a secondary planet carrier having at least two secondary planet gears carried thereon,
    a secondary motor operatively coupled to a second input means; and
    a servomotor, or a stepping motor, or a servogenerator operatively coupled to and for controlling a rotational speed of said secondary control means;
    wherein one of said secondary ring gear, said secondary sun gear, and said secondary planet carrier of said secondary planetary gear set is operatively coupled to and controls the rotational speed of a secondary output means; and said secondary output means is directly coupled to the control means of the primary continuously variable ratio transmission to affect the primary transmission ratio.

4. A continuously variable ratio transmission (CVT) system for controlling a transmission ratio between an input means and an output means over a continuously variable ratio range comprising:

a planetary gear set including a sun gear, a ring gear, and a planet carrier having at least two planet gears carried thereon, and each of said sun gear, said ring gear and said planet carrier being adapted to be coupled to and used as one of said input means, said output means and a control means, said control means comprising a servogenerator adapted to be controlled by a computerized rotary speed controller while generating electric power, and at least one auxiliary field coil of a prime electric motor coupled to the input means to receive the electric power from said servogenerator, the current of said auxiliary field coil controlled by a computerized current controller to enable the control of the speed of the servogenerator and, thus, the transmission ratio of the CVT.

5. The CVT system of claim 4, wherein said servogenerator is adapted to function also as a servomotor to control speed, rotating direction and torque depending on at least one of the controllable electric sources, mechanical power sources, electric load, mechanical load, and input or output electric frequency.

6. The CVT system of claim 4, wherein the output of said CVT system is used to drive a power generator and said servogenerator is to send electric power to said at least one auxiliary field coil of said power generator, which is adapted to be operatively coupled to said output means of the CVT system, the current from the servogenerator to the auxiliary coil of said power generator is controlled by a computerized controller to influence a power output level and hence the transmission ratio to influence the rotary speed of the output means so the frequency of the main variable frequency alternating current (AC) generator and the power capacity of the output electric power is controllable and changeable.

7. The CVT system of claim 4, wherein said CVT system is coupled between an electric motor as a prime driving motor and an application driven device that requires variable driving speed and/torque, at least one auxiliary field coil in said prime driving motor to be supplied by the electric power generated by said servogenerator to adjust the output torque of said prime motor, and said electric power generated by said servogenerator being capable of being affected by the load posed by at least one auxiliary said field coil load through a computerized current controller to affect the desired transmission ratio while supply electricity for additional torque at the desired transmission ratio of said CVT;

means for controlling an electrical current to said at least one auxiliary field coil from said servogenerator;

wherein said servogenerator of said control element is coupled to one of said sun gear, said ring gear, and said planet carrier, such that said servogenerator is capable of controlling the rotation speed ratio among said sun gear, said ring gear, and said planet carrier to which it is coupled to control the transmission ratio of the CVT system.

8. The CVT system of claim 4, wherein each of said sun gear, said planet gears and said ring gear comprise roller elements adapted to be coupled to and frictionally engage each other to replace an ordinary gear-meshing engagement.

* * * * *